April 18, 1950     H. M. LEWIS     2,504,852
MEASURING SYSTEM, INCLUDING AN ELECTRONICALLY
TRACED VERNIER SCALE Filed Feb. 21, 1947     3 Sheets-Sheet 2

*INVENTOR.*
HAROLD M. LEWIS
BY *Harry C. Page*
ATTORNEY

April 18, 1950 H. M. LEWIS 2,504,852
MEASURING SYSTEM, INCLUDING AN ELECTRONICALLY
TRACED VERNIER SCALE
Filed Feb. 21, 1947 3 Sheets-Sheet 3

*INVENTOR.*
HAROLD M. LEWIS
BY
ATTORNEY

Patented Apr. 18, 1950

2,504,852

UNITED STATES PATENT OFFICE 2,504,852

MEASURING SYSTEM, INCLUDING AN ELECTRONICALLY TRACED VERNIER SCALE

Harold M. Lewis, West Allenhurst, N. J., assignor to Hazeltine Research, Inc., Chicago, Ill., a corporation of Illinois Application February 21, 1947, Serial No. 730,117

15 Claims. (Cl. 171—95)

This invention is directed to measuring systems including an electronically traced vernier scale and, while being subject to a variety of applications, it is especially suited for inclusion in direction-finding and range-determining installations. For convenience, the invention will be particularly described in that connection.

A great many of the present-day range-determining systems comprise a transmitter for sending out a challenge, which may be a short pulse of rectangular wave form or a succession of such pulses, to an object or remote location for which range information is desired. This system also includes a receiver, located in the immediate vicinity of the transmitter, for receiving an answer from the remote point to be displayed on a cathode-ray tube controlled by a sweep generator to have a time base properly synchronized with the transmission of the challenge. The answer is generally in the form of short pulses obtained by reflection or transmitted from the remote location in response to the challenge. The position of the answer along the time base of the cathode-ray tube is directly related to the separation of the challenging and answering locations and thus affords an indication of range.

In interpreting the display of the cathode-ray tube, it is necessary to ascertain the distance from the start of the time base to the position of the answer therealong. Knowing this distance and the time represented by a unit length of the time base, an observer is able to compute the desired range. Frequently a mechanical scale is associated with the screen of the cathode-ray tube to facilitate making the necessary measurement of the distance of the answer along the time base. It has also been proposed to apply uniformly spaced pulses of short duration to the tube so as to superimpose a scale on the screen electronically. While such arrangements have been used, they do not provide the degree of accuracy which may sometimes be required in ranging systems, and that is especially true where the answer appears between divisions of the scale.

Of course, in installations where the scale is electronically produced it is possible to increase the repetition rate of the marking pulses to increase the number of scale divisions along the time base in an effort to improve the accuracy. However, where that plan is followed, the marking pulses must be very fine and even then they may run into one another if the separation of succeeding scale divisions is made very small. In other words, it is not practical to construct such a scale in a manner that assures the degree of accuracy required in certain installations.

It is an object of the present invention, therefore, to provide a measuring system which avoids one or more of the aforementioned limitations of prior arrangements.

It is another object of the invention to provide a new and improved system for making distance measurements on the screen of a cathode-ray device by producing electronically a vernier scale for interpolating readings of a principal scale established on the screen.

It is another object of the invention to provide a new and improved system for making distance measurements on the screen of a cathode-ray device with the aid of a major scale and a co-operating vernier scale, each of which is electronically established on the screen.

It is a specific object of the invention to provide a new and improved system for making distance measurements on a cathode-ray device by electronically producing a major scale and a co-operating vernier scale, each of which is adjustable along the screen to permit making a variety of measurements.

In accordance with the invention, a measuring system including an electronically traced vernier scale comprises a cathode-ray line-tracing device having a screen and an electrode system for developing an electron beam incident upon the screen. The system has means for controlling the beam to trace a line and to produce on the screen an indication which is to be measured. It also includes means for establishing on the screen a major scale associated with the aforesaid indication and providing therewith a measure of distance. The system also embodies a vernier-signal generator so proportioned as to generate a series of uniformly spaced signals with a separation related to divisions in the major scale in accordance with the relation $$\frac{n}{n+1}$$

where $n$ is an integer. Means are provided for applying the series of uniformly spaced signals to the cathode-ray device to control the beam in the device to trace a vernier scale associated with the major scale and means are also provided for controlling the positioning of the vernier scale with respect to the major scale to position one division of the vernier scale in alignment with the indication present in the cathode-ray tube to facilitate accurate interpolation of readings intermediate the divisions of the major scale.

For a better understanding of the present invention, together with other and further objects thereof, reference is had to the following description taken in connection with the accompanying drawings, and its scope will be pointed out in the appended claims.

Figure 1:
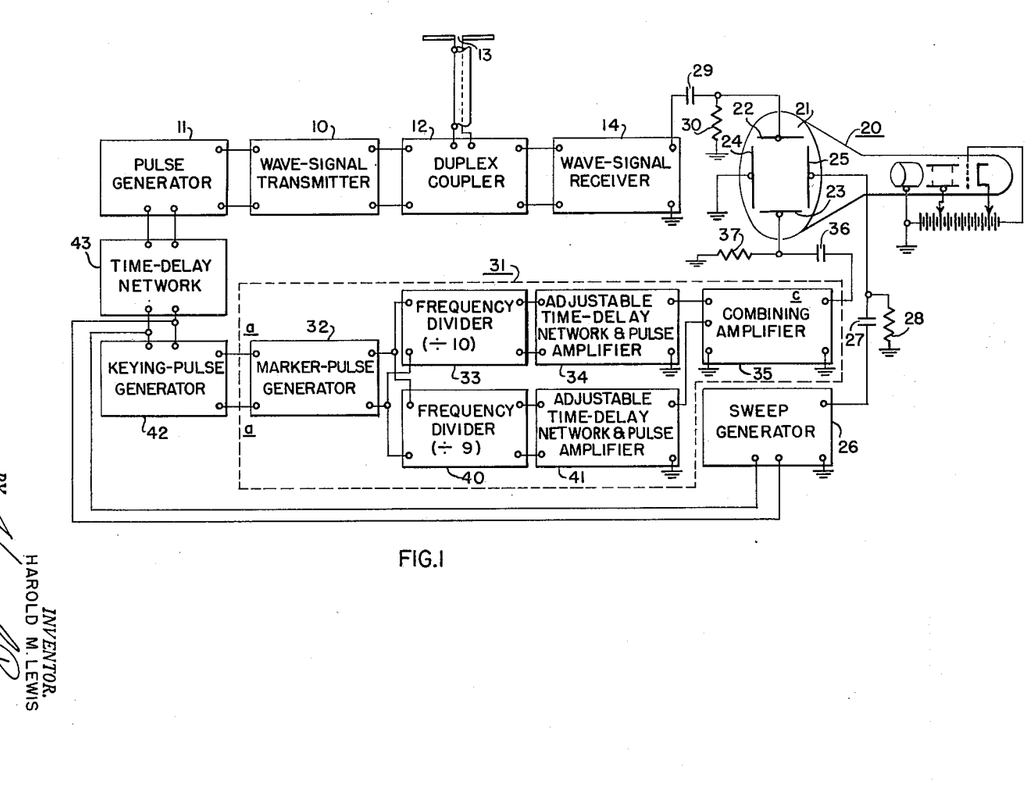
Fig. 1 is a schematic representation of a range-determining system incorporating the present invention in one form.

Referring now more particularly to Fig. 1, the range-determining system there represented is conventional except for those components, to be described hereinafter, which establish suitable scales on the screen of the cathode-ray tube to permit a vernier reading with its attendant accuracy. The over-all system includes a wave-signal transmitter 10 normally maintained in an inoperative position but including a keying or triggering circuit for responding to control pulses which determine the transmitting intervals both as to duration and time separation. A pulse generator 11 has an output circuit coupled with the input or keying circuit of transmitter 10, providing a convenient control over the transmitter operation. The output circuit of transmitter 10 is connected with a first pair of terminals of a duplex coupler 12 through which signals generated in the transmitter are applied to an antenna system 13 for radiation. The antenna, which may be directive or not in accordance with the requirements of the particular installation, is represented in the form of a simple dipole connected by a length of coaxial cable to a second pair of terminals of the duplex coupler. A third pair of terminals of this coupler is connected with the input circuit of a wave-signal receiver 14 for supplying thereto signals intercepted by the antenna system. The duplex coupler may have any of a variety of forms, and essentially, is an arrangement which selectively couples either transmitter 10 or receiver 14 to antenna 13 with impedance matching while effectively disconnecting the other of these units when any one is connected in circuit with the antenna. One suitable form of duplexer, as it is commonly called in the art, is shown in Patent 2,415,318 issued February 4, 1947, in the name of Harold A. Wheeler and assigned to the same assignee as the present invention.

The units mentioned thus far are the principal components for transmitting a challenge and for receiving an answer, in the usual way, in known range-determining systems. These units may have any conventional design and construction. The remaining components represented in Fig. 1 constitute a system, in accordance with the invention, for making distance measurements.

The measuring system comprises a cathode-ray line-tracing device 20, having an electrode system for developing an electron beam and for accelerating as well as focusing that beam to be incident upon a screen or target area 21 of the long-persistence type. The tube representation has been distorted in order more clearly to represent the screen surface and the deflecting elements utilized to control the position of the electron beam on the screen. These deflecting elements are provided by a pair of vertically aligned electrodes 22, 23 and a pair of horizontally aligned electrodes 24, 25. A sweep generator 26 constitutes means for supplying a line-scanning signal to control the electron beam of tube 20 periodically to trace a line on screen 21 and to produce on the screen an indication which is to be measured when signals from receiver 14 are applied to the tube during any line-trace interval. The nature of the line traced during any trace interval is related to the wave form of the signal developed by generator 26 and may be varied as desired. However, in most installations the beam is to make a horizontal linear traverse of the screen in each line-trace interval and, to that end, generator 26 is selected to supply to its output circuit a repeating signal of saw-tooth wave form to effect scanning of screen 21 with the electron beam during cyclically recurring line-scanning intervals in a manner similar to conventional television practice. The output circuit of the generator is coupled through a resistance-capacitance network, including a condenser 27 and a resistor 28, to horizontal-deflecting electrode 25, the companion electrode 24 being grounded. The output circuit of receiver 14 is similarly connected, through a condenser 29 and a resistor 30, to vertical-deflecting electrode 22 and comprises means for controlling the cathode-ray beam to produce on screen 21 an indication which is to be measured. The companion vertical-deflecting electrode 23 is coupled with a marker or pulse-generating system 31, enclosed within broken construction lines.

The marker system includes a pulse generator 32 arranged to produce narrow pulses of rectangular wave form which have a time separation corresponding to the propagation time in space of a signal over a loop path of one mile, this time being approximately equal to 10.5 microseconds. The output circuit of generator 32 is connected with the input circuit of a first frequency divider 33 which, for the embodiment under consideration, is constructed to divide the applied pulses by ten. The frequency divider 33 is coupled through an adjustable time-delay network and pulse amplifier 34 to one input terminal of a conventional combining amplifier 35, the output terminal c of which is connected through a coupling network, including a condenser 36 and a resistor 37, to vertical-deflecting plate 23. Units 33, 34 and 35 comprise means for applying to the deflecting-electrode system of tube 20 a first series of uniformly spaced signals to control the beam thereof to establish on screen 21 a major scale, in a manner to be made clear hereinafter.

The output circuit of marker-pulse generator 32 is also connected with the input circuit of a second frequency divider 40 to form a vernier-signal generator. The frequency divider 40 has a division ratio of nine and has an output circuit coupled through an adjustable time-delay network and pulse amplifier 41 to a second input circuit of combining amplifier 35. Units 40, 41 and 35 comprise means for simultaneously applying a second series of uniformly spaced signals to the deflecting-electrode system of tube 20 to control the tube to trace a distinguishable vernier scale, associated with the major scale, and having one division in alignment with an indication on screen 21 to facilitate accurate interpolation of distance readings under operating conditions in which such indication falls intermediate divisions of the major scale.

The adjustable time-delay networks of units 34 and 41 may have any well-known construction. One suitable arrangement is shown in Fig. 1 of copending application Serial No. 668,095 filed May 8, 1946, now abandoned, in the name of Jasper J. Okrent and assigned to the same assignee as the present invention. In that construction, the time-delay network has an elongated or distributed winding and a capacitive pickup device displaceable along the winding which permits output signals to be obtained therefrom with an adjustable delay. Another convenient arrangement is shown in Fig. 1 of United States Letters Patent 2,226,706 granted on December 31, 1940 to Madison Cawein and likewise assigned to the same assignee as this invention. In the Cawein patent, appropriate selection of the time constants of relaxation oscillators 11 and 13 of the Fig. 1 arrangement permits pulses of controllable duration and time separation to be obtained.

It is customary properly to synchronize and phase the time base of cathode-ray tube 20 and the scale-marker system with one another and with the operation of transmitter 10. Synchronization is readily obtained where the pulse-repetition frequency of generator 11 is a submultiple of the operating frequency of pulse generator 32 and, in such a case, the pulses obtained from frequency dividers 33 and 40 establish scale divisions on screen 21 which are stationary, having fixed positions on the screen in succeeding line-trace intervals. However, it is generally more desirable to have a free choice in the pulse-repetition rate of generator 11. Therefore, it is contemplated that pulse generator 32 be normally biased to be inoperative. A keying-pulse generator 42 has a synchronizing circuit to which an output circuit of pulse generator 11 is connected through a time-delay network 43. The output circuit of keying-pulse generator 42, in turn, is connected with synchronizing terminals a, a of the marker-pulse generator. Also, a synchronizing circuit of sweep generator 26 is connected with pulse generator 11 through the same time-delay network 43.

Before considering the operation of the described arrangement, it is desirable to mention certain characteristics of keying-pulse generator 42, time-delay network 43 and sweep generator 26. Generator 42, preferably, is arranged to produce at its output terminals a keying pulse having a relatively long duration. That pulse, as applied to marker-pulse generator 32, is of positive polarity to key or gate the latter for one cycle of operation which commences at the start of the sweep or line-trace interval of tube 20 and concludes approximately at the end of that interval. The time-delay network 43 delays the keying of generators 26 and 42 to allow for any delay which may be encountered between the generation of a pulse in generator 11 and the transmission of a related pulse of a challenging signal from antenna system 13, as well as any delay which may be experienced at the remote point in returning an answer signal. Where those delays are negligible, network 43 may be omitted, and the synchronizing circuits of generators 26 and 42 may be directly connected with an output circuit of pulse generator 11. It is also desirable that the line-trace interval determined by sweep generator 26 be long enough to provide a time base for tube 20 that will accommodate a range determination over the longest distances for which the system of Fig. 1 is intended to be operated.

In operation, generator 11 applies a control pulse to transmitter 10 and the latter is energized, applying to antenna 13 a single pulse of a carrier signal which is radiated to the remote point or location. Assuming the object at the remote point for which range information is desired to be a wave-signal reflector, the pulse from generator 11 triggers generators 26 and 42 coincidentally with the transmission of the challenge pulse from antenna 13. As a consequence, sweep generator 26 controls the cathode-ray beam of tube 20 to execute one line trace of the screen, starting with the transmission of the challenge. At the same time, marker-pulse generator 32 commences the generation of pulses having the uniform time separation previously recited which may be termed "one-mile pulses." These pulses, being divided by ten in frequency divider 33, are applied through adjustable time-delay network and pulse amplifier 34 with one polarity to combining amplifier 35 and thence to vertical-deflecting electrode 23. The effect of this series of pulses from frequency divider 33 is periodically to deflect the beam of tube 20 to one side of the line otherwise traced under the control of the line-scanning signal from generator 26, establishing a major scale on the screen 21. This scale, shown in Fig. 2, has divisions 45 which are uniformly spaced and represent propagation distances of succeeding ten miles between the challenging and answering stations. At the same time, nine-mile pulses, obtained by the output circuit of frequency divider 40, are applied through time-delay network and pulse amplifier 41 with opposite polarity through combining amplifier 35 to the same deflecting electrode 23, periodically to deflect the beam to the other side of the line otherwise traced in a given line-trace interval. Since this last-mentioned series of pulses has a different time separation from those establishing the major scale divisions 45, they establish a distinguishable vernier scale on screen 21, having divisions 46 extending in the opposite direction from the time base and having a different separation than the major scale divisions 45. Preferably, the first series of pulses providing the major scale and the second series of pulses constructing the vernier scale have rectangular wave forms and durations which are short relative to their time separations.

Figure 2:
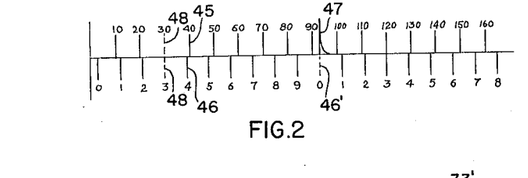
Fig. 2 is a pattern which may be reproduced on the screen of a cathode-ray device included in the system of Fig. 1.

At the time the challenge is received at the remote station and an answer has been returned to the antenna system 13, an output signal is obtained from receiver 14 and applied to vertical-deflecting electrode 22. This signal produces an indication 47 on screen 21 and that indication is obtained by a deflection of the beam in the same sense as that relied on to establish the major scale divisions 45. The indication is established with reference to the major scale and this relationship provides a reading of the distance of indication 47 along the time base. Where the indication is intermediate divisions 45 of the major scale, as represented in Fig. 2, the vernier scale is to be adjusted for an accurate interpolation. This is accomplished by the adjustable time-delay network of unit 41 which constitutes means for adjusting the time relation of the nine-mile or vernier marker pulses to displace the vernier scale relative to the major scale. The adjustment to be made is one in which a division 46' of the vernier scale is brought into alignment with the indication 47 of the answer. Having established this condition, the screen is then observed to find a coincidence between divisions of the major and vernier scales, that coincidence being indicated by the broken construction line 48, 48 in Fig. 2. Knowing the division ratios of the major and vernier scales, the coincidence point 48 permits an exact reading to be obtained of the indication 47 on the time base.

For the example represented in Fig. 2, the indication 47 is shown as occurring somewhere between the divisions identified 90 and 100 on the major scale. The coincidence of the major and vernier scales occurs at the third division on the vernier, showing the exact distance to be ninety-three miles.

The numerals associated with the vernier scale normally do not appear on the screen of the cathode-ray tube but they may be assigned for any condition as follows. The vernier division which is aligned with the indication to be measured is designated the zero or index position. Reading from left to right, assuming that to be the direction of the line trace, the vernier divisions are numbered 1, 2, 3, etc. The divisions to the other side of the index are then numbered 9, 8, 7, etc. In this manner the point of coincidence between divisions of the major and vernier scales is easily identified. Where the separation of the major and vernier scale divisions is very small relative to the length of the time base and where a continuous succession of the marker pulses is supplied throughout the line-trace interval as in the described embodiment, at least one coincidence occurs between major and vernier divisions to interpret the distance of any indication superimposed on the time base. Also, for indications occurring in along the central portion of the time base, two such coincidence points may be found, as shown in Fig. 2, but they give the same reading.

The division ratios of ten and nine for frequency dividers 33 and 34, respectively, are merely chosen by way of illustration. It is well known that a wide range of divisions is available for the major and minor scales in accordance with well-known vernier techniques. For the case selected, the least count is one-tenth of a major scale division, indicating that the vernier accurately interpolates readings between divisions of the major scale to the nearest tenth. In general, the major and vernier scale divisions may be chosen in accordance with the following expression:

$$nL = (n+1)V \qquad (1)$$

where,

L is the width of a division of the major scale;
V is the width of a division of the vernier scale; and
$n$ is an integer.

Where the divisions of the major and vernier scales represent deflections of the beam in opposite directions from the line traced under the control of sweep generator 26 as in the described embodiment, it is evident that the coincidence point 48—48 of divisions on the major and vernier scales represents an instant at which the vertical-deflecting forces exerted by the major and vernier marker pulses on the beam are equal and opposite and they, therefore, cancel one another. This breaks the uniform spacing of the divisions on both scales so that the coincidence point is immediately apparent. As shown in Fig. 2, the first division of the major scale occurs at the start of the line-trace interval. This relationship may be assured by varying the time relation of the pulses obtained from frequency divider 33 through suitable adjustment of the time-delay network in unit 34.

Figures 3, 4:
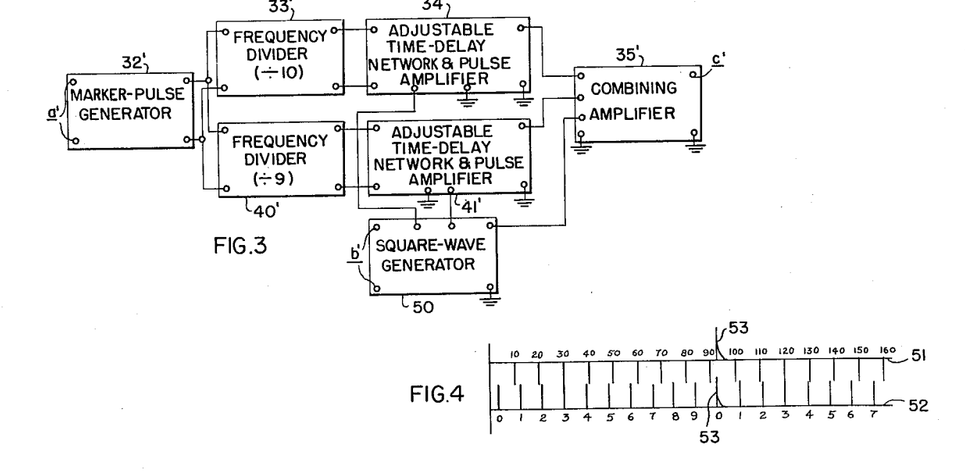
Fig. 3 is a schematic representation of a modified form of marker system which may be utilized in the Fig. 1 arrangement.
Figs. 4 and 5 represent patterns which may be produced on the screen of the cathode-ray device when the Fig. 1 arrangement embodies the modified marker system of Fig. 3.

The range-determining system of Fig. 1 superimposes both the major and vernier scales on a single line traced on the screen of the cathode-ray tube, but in some installations it may be more convenient to separate these scales, placing them upon displaced lines traced on the screen. If such a display should be desired in an arrangement of the type shown in Fig. 1, unit 31 thereof may be replaced by the modified pulse-generating system represented schematically in Fig. 3. This modification is generally similar to unit 31 and corresponding components thereof are identified by the same reference characters primed. The marker-producing system of Fig. 3 includes a generator 50 of conventional design and construction for producing a signal of square wave form having a frequency which is equal to one-half the pulse-repetition rate of pulse generator 11 of Fig. 1. One output circuit of generator 50 is connected with the pulse-amplifying section of unit 34'. A second output circuit is likewise coupled to the amplifying section of unit 41' and a third output circuit is connected with an input circuit of combining amplifier 35'. This generator 50, when the marker arrangement of Fig. 3 is incorporated into the ranging system of Fig. 1, comprises means for displacing the beam of cathode-ray tube 20 throughout alternate ones of the line-trace intervals to trace a pair of similar but displaced lines on screen 21. It also serves as means for controlling units 34' and 41' so that the divisions of the major scale are superimposed on one of the lines traced on the screen 21, while the divisions of the vernier scale are superimposed on the other line traced on the screen. To substitute the embodiment of Fig. 3 for unit 31 of Fig. 1, the terminals $a'$, $a'$ of its generator 32' are connected with the output terminals of keying-pulse generator 42; input terminals $b'$, $b'$ of square-wave generator 50 are connected with the output terminals of time-delay network 43 and output terminal $c'$ of combining amplifier 35' is connected through condenser 36 and resistor 37 to the vertical-deflecting electrode 23.

With the marker system of Fig. 3 substituted for unit 31 in the range-determining system of Fig. 1, the square-wave generator 50 applies to vertical-deflecting electrode 23 of tube 20, through combining amplifier 35', a signal of square wave form but of half the repetition frequency of pulse generator 11 and half the line frequency established by sweep generator 26. This square wave is synchronized with sweep generator 26 by virtue of their common connection with pulse generator 11 through time-delay network 43. As a consequence, one set of line-trace intervals for tube 20 occur during the positive half cycles of the square wave and during such intervals the cathode-ray beam traces one line on screen 21. Another set of line-trace intervals, however, occur during the negative half cycles of the square wave and the beam of the cathode-ray tube is displaced vertically to trace a second line on the screen 21 which is parallel with that scribed in the preceding line-trace interval. This periodic displacement of the beam occurs at every other line-trace interval and, therefore, the displaced traces 51 and 52, shown in Fig. 4, appear on screen 21.

The square-wave signals supplied from generator 50 to the pulse-amplifying sections of units 34′ and 41′ are balanced or are out of phase with one another. In each case, the square wave serves as a control signal for blocking each amplifier section during selected ones of the line-trace intervals of the cathode-ray tube. Specifically, the negative half cycles of the square wave applied to pulse amplifier 34′ bias that amplifier to cutoff during line-trace intervals in which the trace 52 is executed while the other pulse amplifier 41′ is biased to cutoff during alternate line-trace intervals in which the trace 51 is accomplished. In view of this control, the marker pulses for establishing the major scale divisions are translated through unit 34′ and combining amplifier 35′ to the vertical-deflecting electrode 23 only during intervals in which the trace 51 occurs. Therefore, as shown in Fig. 4, the divisions constituting the major scale are superimposed on that trace. On the other hand, the marker pulses for establishing the vernier scale are applied to deflecting electrode 23 in time coincidence with the tracing of line 52 to superimpose on that trace the desired vernier scale. During operating intervals in which a signal is intercepted by antenna 13 and applied through receiver 14 to the cathode-ray tube, the indication 53 is established on each scale. Its position along the major scale of trace 51 provides an approximate indication of the desired range, the exact indication being available through the use of the vernier. To this end, the time-delay network of unit 41′ is adjusted to align one division of the vernier scale with the indication 53 and the coincidence between divisions of the major and vernier scales gives the exact reading which is ninety-three miles for the illustration of Fig. 4. It will be understood that the number of amplifying sections in each of the units 34′ and 41′ is selected to have the divisions of both scales fall on the sides of traces 51 and 52 in the manner indicated.

The modified marker system of Fig. 3 may be operated, if desired, to establish major and minor scales along a single trace of the cathode-ray tube by omitting the connection from generator 50 to combining amplifier 35′. Where that connection is removed, the beam of cathode-ray tube 20 traverses the same line on screen 21 during each line-trace interval but the control of the pulse-amplifying sections of units 34′ and 41′ permits the major scale to be established in one line-trace interval and the vernier scale to be traced in the next line-trace interval. This method of establishing the scales on a single trace has the advantage that the major and vernier scale marking pulses occur during different sets of line-trace intervals so that divisions of these scales which are in alignment may appear together on screen 21.

Figure 5:
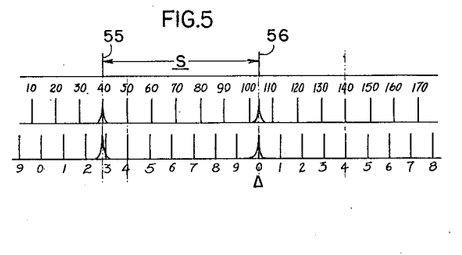

For certain operating conditions, a single pulse of a challenging signal transmitted from antenna 13 may provoke an answer from two separated remote points or stations, causing a pair of indications to appear on screen 21 of the cathode-ray tube. The distance to either of the remote stations may be determined with any of the described embodiments of the invention as already explained but it is also possible to ascertain the separation of one remote station relative to the other if the antenna system 13 is directional. Consider, for example, the pattern of Fig. 5 which shows an indication 55 from one station and an indication 56 from another station having the same general bearing relative to the challenging equipment. For convenience, these indications are represented on a third trace of screen 21 whereas, in fact, they occur on the major and minor scales and occupy one or two traces depending upon whether the marker system 31 of Fig. 1 or the modified marker system of Fig. 3 is employed. To determine the separation s of the remote stations, the time-delay network of unit 34 or 34′ is adjusted to align one division of the major scale with the first indication 55. Then, the number of major scale divisions between the indications 55 and 56 gives an approximate indication of the distance s. By adjusting the time-delay network of unit 41 or 41′ to align a division of the vernier scale with the second indication 56, the exact distance reading is observable. For the pattern of Fig. 5, the distance s corresponds with a separation between the remote stations of sixty-four miles.

Figure 6:
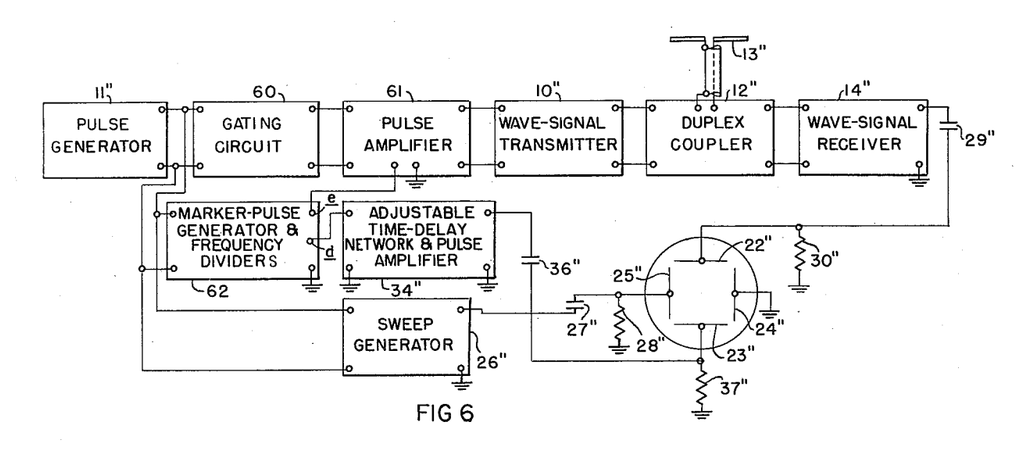
Fig. 6 represents a modified form of a range-determining system also utilizing the invention; while Fig. 7 indicates a pattern which may be established on the screen of the cathode-ray device included in the ranging system of Fig. 6.

Another form of range-determining system is represented schematically in Fig. 6. It includes many components similar to those of Fig. 1, identified by the same reference characters double primed. However, a gating circuit 60 and a pulse amplifier 61 are interposed between pulse generator 11″ and the transmitter 10″. Also, the unit 62 is intended to represent the portions of the marker system of Fig. 1 including generator 32 as well as the frequency dividers 33 and 40. This unit then supplies to one output terminal d the ten-mile or major scale pulses and to a terminal e the nine-mile or vernier scale pulses. Pulse generator 11″ again synchronizes the sweep generator 26″ as well as the marker-pulse generator 62 although the time-delay networks which may be desirable properly to orient the marker system and the line-trace intervals with the transmission of pulses from the antenna 13″ have been omitted to simplify the drawing. The gating circuit 60 may have any of a variety of well-known forms, one simple construction being a generator for providing a pulse of positive polarity, rectangular wave form, and of a desired duration.

Figure 7:
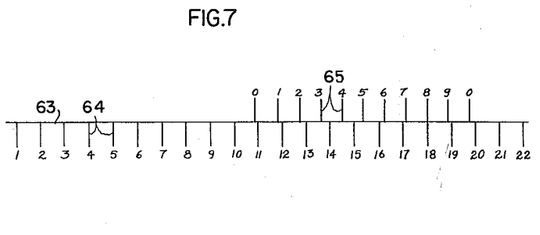

In the operation of the Fig. 6 arrangement, sweep generator 26″ controls the beam of the cathode-ray tube to traverse a linear path across the screen, tracing a single line 63 thereon as shown in Fig. 7. The marker pulses applied through unit 34″ to deflecting electrode 23 superimpose the major scale divisions 64 on the line traced on the screen. Each pulse from generator 11″ causes gating circuit 60 to apply a control pulse to amplifier 61, permitting that amplifier to accept a series of eleven nine-mile pulses from terminal e of the marker-pulse generator 62. This series of pulses controls transmitter 10″ to transmit a corresponding series of pulses of a carrier signal. The remote station, which usually answers the challenge in a pulse-by-pulse fashion, then returns a series of the same number of pulses and with the same time separation to the challenging station. These pulses of the answer, after being intercepted by antenna 13″, are supplied through receiver 14″ to the vertical-deflecting electrode 22″. The answer appears on the screen 21 of the cathode-ray tube as a series of divisions 65 which also constitute a vernier scale. The first division of the vernier has a spacing along the major scale 63 which affords the desired indication of range and one other division which is in alignment with a division of the major scale provides the accurate determination of range, 108 miles for the case illustrated in Fig. 7.

In each of the described embodiments, the invention permits accurate determinations of distance, which distance, for the cases under consideration, denotes the separation of a challenging and an answering station. The system features a high degree of accuracy, obtaining that result through the aid of relatively adjustable major and vernier scales. Inasmuch as the alignment of divisions on the major and vernier scales is relied upon to interpolate readings between divisions of the major scale, it is apparent that the divisions of neither scale have to be exceedingly fine. This avoids difficulties encountered in translating pulses of extremely short duration while maintaining the wave form.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A measuring system including an electronically traced vernier scale comprising: a cathode-ray line-tracing device having a screen and an electrode system for developing an electron beam incident upon said screen; means for controlling said beam to trace a line and to produce on said screen an indication which is to be measured; means for establishing on said screen a major scale associated with said indication and providing therewith a measure of distance; a vernier-signal generator so proportioned as to generate a series of uniformly spaced signals with a time separation related to that of said major scale in accordance with the relation $$\frac{n}{n+1}$$

where $n$ is an integer; means for applying said series of uniformly spaced signals to said device to control said beam to trace a vernier scale associated with said major scale; and means for controlling the positioning of said vernier scale with respect to said major scale to position one division of said vernier scale in alignment with said indication to facilitate accurate interpolation of readings intermediate the divisions of said major scale.

2. A measuring system including an electronically traced vernier scale comprising: a cathode-ray line-tracing device having a screen and an electrode system for developing an electron beam incident upon said screen; means for controlling said beam to trace a line and to produce on said screen an indication which is to be measured; means for establishing on said screen a major scale associated with said indication and providing therewith a measure of distance; a vernier-signal generator so proportioned as to generate a series of uniformly spaced signals with a separation related to that of said major scale in accordance with the relation $$\frac{n}{n+1}$$

where $n$ is an integer; means for applying said series of uniformly spaced signals to said device to trace a vernier scale associated with said major scale; and means for adjusting the time relation of said series of signals to displace said vernier scale relative to said major scale and align one division thereof with said indication to facilitate accurate interpolation of readings intermediate the divisions of said major scale.

3. A measuring system including an electronically traced vernier scale comprising; a cathode-ray line-tracing device having a screen and an electrode system for developing an electron beam incident upon said screen; means for controlling said beam to trace a line and to produce on said screen an indication which is to be measured; means for applying to said device a first series of uniformly spaced signals to control said device to trace on said screen a major scale associated with said indication and providing therewith a measure of distance; a vernier-signal generator so proportioned as to generate a second series of uniformly spaced signals with a time separation related to that of said first series in accordance with the relation $$\frac{n}{n+1}$$

where $n$ is an integer; means for applying said second series of uniformly spaced signals to said device to control said beam to trace a distinguishable vernier scale associated with said major scale; and means for controlling the positioning of said vernier scale with respect to said major scale to position one division of said vernier scale in alignment with said indication to facilitate accurate interpolation of readings intermediate the divisions of said major scale.

4. A measuring system including an electronically traced vernier scale comprising: a cathode-ray line-tracing device having a screen and an electrode system for developing an electron beam incident upon said screen; means for controlling said beam to trace a line and to produce on said screen an indication which is to be measured; means for applying to said device a first series of uniformly spaced pulses, having a separation large relative to their duration, to control said device to trace on said screen a major scale associated with said indication and providing therewith a measure of distance; a vernier-signal generator so proportioned as to generate a second series of uniformly spaced pulses with a time separation related to that of said first series in accordance with the relation $$\frac{n}{n+1}$$

where $n$ is an integer; means for applying said second series of uniformly spaced pulses to said device to control said beam to trace a distinguishable vernier scale associated with said major scale; and means for controlling the positioning of said vernier scale with respect to said major scale to position one division of said vernier scale in alignment with said indication to facilitate accurate interpolation of readings intermediate the divisions of said major scale.

5. A measuring system including an electronically traced vernier scale comprising: a cathode-ray line-tracing device having a screen and an electrode system for developing an electron beam incident upon said screen; means for controlling said beam to trace a line and to produce on said screen an indication which is to be measured; means for applying to said device a first series of uniformly spaced pulses, having a separation large relative to their duration, to control said device to trace on said screen a major scale associated with said indication and providing therewith a measure of distance; a vernier-signal generator so proportioned as to generate a second series of uniformly spaced pulses with a time separation related to that of said first series in accordance with the relation $$\frac{n}{n+1}$$

where $n$ is an integer; means for simultaneously applying said second series of uniformly spaced pulses to said device to control said beam to trace a distinguishable vernier scale associated with said major scale; and means for controlling the positioning of said vernier scale with respect to said major scale to position one division of said vernier scale in alignment with said indication to facilitate accurate interpolation of readings intermediate the divisions of said major scale.

6. A measuring system including an electronically traced vernier scale comprising: a cathode-ray line-tracing device having a screen and an electrode system for developing an electron beam incident upon said screen; means for controlling said beam to trace a line and to produce on said screen an indication which is to be measured; a calibation-signal generation for applying to said device a first series of uniformly spaced pulses, having a separation large relative to their duration, periodically to deflect said beam to one side of said line to trace on said screen a major scale associated with said indication and providing therewith a measure of distance; a vernier scale generator so proportioned as to generate a second series of uniformly spaced pulses with a time separation related to that of said first series in accordance with the relation $$\frac{n}{n+1}$$

where $n$ is an integer; means for applying said second series of uniformly spaced pulses to said device periodically to deflect said beam to the other side of said line to trace a distinguishable vernier scale associated with said major scale; and means for controlling the positioning of said vernier scale with respect to said major scale to position one division of said vernier scale in alignment with said indication to facilitate accurate interpolation of readings intermediate the divisions of said major scale.

7. A measuring system including an electronically traced vernier scale comprising: a cathode-ray line-tracing device having a screen and an electrode system for developing an electron beam incident upon said screen; means for controlling said beam to trace a pair of similar but displaced lines on said screen and to produce on at least one of said lines an indication which is to be measured; means for applying to said device a first series of uniformly spaced pulses, having a separation large relative to their duration, to control said beam to superimpose on one of said lines a major scale associated with said indication and providing therewith a vernier-signal generator so proportioned as to generate a second series of uniformly spaced pulses with a separation related to that of said first series in accordance with the relation $$\frac{n}{n+1}$$

where $n$ is an integer; means for applying said second series of uniformly spaced pulses to said device to control said beam to superimpose on the other of said lines a vernier scale; and means for adjusting the time relation of said second series of pulses to effect relative displacement of said vernier and major scales and align one division of said vernier scale with said indication to facilitate accurate interpolation of readings intermediate the divisions of said major scale.

8. A measuring system including an electronically traced vernier scale comprising: a cathode-ray line-tracing device having a screen and an electrode system for developing an electron beam incident upon said screen; means for controlling said beam to trace a pair of similar but displaced lines on said screen and to produce on at least one of said lines an indication which is to be measured; means for applying to said device only during the tracing of one of said lines a first series of uniformly spaced pulses, having a separation large relative to their duration, to control said beam to superimpose on said one line a major scale associated with said indication and providing therewith a measure of distance; a vernier-signal generator so proportioned as to generate a second series of uniformly spaced pulses with a separation related to that of said first series in accordance with the relation $$\frac{n}{n+1}$$

where $n$ is an integer; means for applying said second series of uniformly spaced pulses to said device only during the tracing of the other of said lines to control said beam to superimpose on said other line a vernier scale; and means for adjusting the time relation of said second series of pulses to effect relative displacement of said vernier and major scales and align one division of said vernier scale with said indication to facilitate accurate interpolation of readings intermediate the divisions of said major scale.

9. A measuring system including an electronically traced vernier scale comprising: a cathode-ray line-tracing device having a screen and an electrode system for developing an electron beam incident upon said screen; means for controlling said beam periodically to trace a line and to produce on said screen an indication which is to be measured; means for applying to said device during one line-trace interval a first series of uniformly spaced pulses synchronized and phased relative to said line-trace interval to control said beam to superimpose on said line a major scale associated with said indication and providing therewith a measure of distance; a vernier-signal generator so proportioned as to generate a second series of uniformly spaced pulses with a separation related to that of said first series in accordance with the relation $$\frac{n}{n+1}$$

where $n$ is an integer; means for applying during another line-trace interval said second series of uniformly spaced pulses to said device to control said beam to superimpose on said line a distinguishable vernier scale; and means for adjusting the time relation of said second series of pulses to effect relative displacement of said vernier and major scales and align one division of said vernier scale with said indication to facilitate accurate interpolation of readings intermediate the divisions of said major scale.

10. A measuring system including an electronically traced vernier scale comprising: a cathode-ray line-tracing device having a screen and an electrode system for developing an electron beam incident upon said screen; means for controlling said beam periodically to trace a line and to produce on said screen an indication which is to be measured; means for applying to said device during one line-trace interval a first series of uniformly spaced pulses of one polarity synchronized and phased relative to said line-trace interval to control said beam to superimpose on said line a major scale associated with said indication and providing therewith a measure of distance; a vernier-signal generator so proportioned as to generate a second series of uniformly spaced pulses having an opposite polarity and with a separation related to that of said first series in accordance with the relation $$\frac{n}{n+1}$$

where $n$ is an integer; means for applying during another line-trace interval said second series of uniformly spaced pulse to said device to control said beam to superimpose on said line a distinguishable vernier scale; and means for adjusting the time relation of said second series of pulses to effect relative displacement of said vernier and major scales and align one division of said vernier scale with said indication to facilitate accurate interpolation of readings intermediate the divisions of said major scale.

11. A measuring system including an electronically traced vernier scale comprising: a cathode-ray line-tracing device having a screen and an electrode system for developing an electron beam incident upon said screen; means for controlling said beam periodically to traverse said screen during each of a series of line-trace intervals and to produce on said screen an indication which is to be measured; means for displacing said beam on said screen throughout alternate ones of said intervals so that said beam traces a pair of similar but displaced lines on said screen; means for applying to said device during the tracing of one of said lines a first series of uniformly spaced pulses synchronized and phased relative to said line-trace interval to control said beam to superimpose on said one line a major scale associated with said indication and providing therewith a measure of distance; a vernier-signal generator so proportioned as to generate a second series of uniformly spaced pulses with a separation related to that of said first series in accordance with the relation $$\frac{n}{n+1}$$

where $n$ is an integer; means for applying said second series of uniformly spaced pulses to said device only during the tracing of the other of said lines to control said beam to superimpose on said other line a distinguishable vernier scale, and means for adjusting the time relation of said second series of pulses to effect relative displacement of said vernier and major scales and align one division of said vernier scale with said indication to facilitate accurate interpolation of readings intermediate the divisions of said major scale.

12. A measuring system including an electronically traced vernier scale for making distance measurements between a pair of indications comprising: a cathode-ray line-tracing device having a screen and an electrode system for developing an electron beam incident upon said screen; means for controlling said beam to trace a line and to produce on said screen said pair of indications which are to be measured; means for applying to said device a first series of uniformly spaced signals to control said device to trace a major scale associated with said indications; means for adjusting the time relation of said first series of signals to displace said major scale to align one division thereof with one of said indications and to provide with said indications a measure of distance; a vernier-signal generator so proportioned as to generate a second series of uniformly spaced signals with a time separation related to that of said first series in accordance with the relation $$\frac{n}{n+1}$$

where $n$ is an integer; means for applying said second series of uniformly spaced signals to said device to control said beam to trace a distinguishable vernier scale associated with said major scale; and means for adjusting the time relation of said second series of signals to displace said vernier scale and align one division thereof with the other of said indications to facilitate accurate interpolation of readings intermediate the divisions of said major scale.

13. A measuring system including an electronically traced vernier scale comprising: a cathode-ray line-tracing device having a screen and an electrode system for developing an electron beam incident upon said screen; means for controlling said beam to traverse a predetermined path across said screen; means for establishing on said screen a major scale associated with said path; a vernier-signal generator so proportioned as to generate a series of uniformly spaced signals with a separation related to that of said major scale in accordance with the relation $$\frac{n}{n+1}$$

where $n$ is an integer and having one particular division representing an indication to be measured; means for applying said series of uniformly spaced signals to said device to control said beam to trace a vernier scale associated with said major scale; and means for controlling the positioning of said one particular division of said vernier scale with respect to said major scale to provide a measure of distance and for controlling the others of said divisions to facilitate accurate interpolation of readings intermediate the divisions of said major scale.

14. A measuring system including an electronically traced vernier scale comprising: a cathode-ray line-tracing device having a screen, an electrode system for developing an electron beam incident upon said screen, and deflecting elements for controlling the position of said beam; a sweep generator for applying a line-scanning signal to said deflecting elements to control said beam to trace a line on said screen; means for controlling said beam to establish on said line an indication which is to be measured; a pulse-generating system so proportioned as to generate a first series of uniformly spaced pulses and a second series of uniformly spaced pulses having a time separation related to that of said first series in accordance with the relation $$\frac{n}{n+1}$$

where $n$ is an integer; means for so applying said series of uniformly spaced signals to said deflecting elements that said first series of pulses deflect said beam to establish a major scale on said screen associated with said indication to provide a measure of distance and said second series of pulses deflect said beam to trace a distinguishable ernier scale associated with said major scale; and an adjustable time-delay network included in said generating system for varying the time relation of said second series of pulses to displace said vernier scale and align one division thereof with aid indication to facilitate accurate interpolation of readings intermediate the divisions of said major scale.

15. A measuring system including an electronically traced vernier scale comprising: a cathode-ray line-tracing device having a screen, an electrode system for developing an electron beam incident upon said screen, and deflecting elements for controlling the position of said beam; a sweep generator for applying a line-scanning signal to said deflecting elements to control said beam to trace a line on said screen; means for controlling said beam to establish on said line an indication which is to be measured; pulse-generating system synchronized with said sweep generator so proportioned as to generate a first series of uniformly spaced pulses and a second series of uniformly spaced pulses having a time separation related to that of said first series in accordance with the relation $$\frac{n}{n+1}$$

where $n$ is an integer; means for applying said series of uniformly spaced signals to said deflecting elements so that said first series of pulses deflect said beam to establish a major scale on said screen associated with said indication and providing therewith a measure of distance, and said second series of pulses deflect said beam to trace a distinguishable vernier scale associated with said major scale; and an adjustable time-delay network included in said generating system for varying the time relation of said second series of pulses to displace said vernier scale and align one division thereof with said indication to facilitate accurate interpolation of readings intermediate the divisions of said major scale.

HAROLD M. LEWIS.

REFERENCES CITED

The following references are of record in the file of this patent:

UNITED STATES PATENTS

| Number | Name | Date |
| --- | --- | --- |
| 2,208,378 | Luck | July 16, 1940 |
| 2,312,761 | Hershberger | Mar. 2, 1943 |
| 2,430,570 | Hulst | Nov. 11, 1947 |